(12) United States Patent
Blackmon

(10) Patent No.: US 10,816,383 B1
(45) Date of Patent: Oct. 27, 2020

(54) APPARATUS AND METHOD FOR DETERMINATION OF LIQUID MASS

(71) Applicant: James B. Blackmon, Brownsboro, AL (US)

(72) Inventor: James B. Blackmon, Brownsboro, AL (US)

(73) Assignee: Board of Trustees of the University of Alabama, Huntsville, AL (US), for and on behalf of the University of Alabama in Huntsville ( * ) Notice: Subject to any disclaimer, the term of this patent is extended or adjusted under 35 U.S.C. 154(b) by 0 days.

(21) Appl. No.: 14/657,860

(22) Filed: Mar. 13, 2015

Related U.S. Application Data

(60) Provisional application No. 61/952,684, filed on Mar. 13, 2014.

(51) Int. Cl.
G01F 23/26 (2006.01)

(52) U.S. Cl.
CPC .................. *G01F 23/263* (2013.01)

(58) Field of Classification Search
CPC ...................................... G01F 23/263
See application file for complete search history.

(56) References Cited

U.S. PATENT DOCUMENTS

| 2,752,543 A * | 6/1956 | Smith | G01F 23/268 |
| | | | 361/284 |
| 2,867,120 A * | 1/1959 | Schafer | G01F 23/263 |
| | | | 73/304 C |
| 3,389,602 A * | 6/1968 | Clemens | G01F 23/263 |
| | | | 73/304 C |
| 3,492,793 A * | 2/1970 | Bhuta | B64G 1/50 |
| | | | 96/6 |
| 3,639,835 A * | 2/1972 | Dammig, Jr. | G01F 23/263 |
| | | | 324/686 |

(Continued)

FOREIGN PATENT DOCUMENTS

JP 2016217918 A 12/2016

OTHER PUBLICATIONS

William R. Smythe, "Static and Dynamic Electricity," McGraw-Hill Book Company, pp. 361-362.

(Continued)

*Primary Examiner* — Lisa M Caputo
*Assistant Examiner* — Alex T Devito
(74) *Attorney, Agent, or Firm* — Maynard Cooper & Gale P.C.; Jon E. Holland

(57) ABSTRACT

The present disclosure generally pertains to devices and methods for determining propellant mass based on average measurements irrespective of the fluid orientation in a fuel tank. The device is useful in detecting fuel levels in tanks where the fuel is in motion, for instance in aircraft (i.e., undergoing varying acceleration maneuvers) or spacecraft (i.e., a microgravity environment). The devices and methods can also be used for determining the liquid in a surface tension screen liquid acquisition device (LAD), and particularly, the incipient breakdown as gas bubbles enter or are formed inside the LAD as the screen dries or heat transfer induces vaporization. The same basic electrode configuration can be used to stir the liquid to reduce thermal stratification and condense vapor bubbles.

27 Claims, 14 Drawing Sheets

(56) References Cited

U.S. PATENT DOCUMENTS

| | | | | |
|---|---|---|---|---|
| 3,795,146 | A | * | 3/1974 | Wilson .................. G01F 23/263 |
| | | | | 73/304 C |
| 4,384,962 | A | * | 5/1983 | Harris ................ B01D 17/0208 |
| | | | | 210/788 |
| 4,483,463 | A | | 11/1984 | Buschmann |
| 4,809,129 | A | | 2/1989 | Hansen, III |
| 5,031,068 | A | * | 7/1991 | Hansen, III ............. F25B 41/00 |
| | | | | 324/673 |
| 5,315,872 | A | * | 5/1994 | Moser .................. G01F 23/268 |
| | | | | 361/284 |
| 6,101,873 | A | * | 8/2000 | Kawakatsu ........... G01F 23/268 |
| | | | | 73/304 C |
| 7,644,889 | B2 | | 1/2010 | Johnson |

OTHER PUBLICATIONS

Nathaniel H. Frank, Sc.D., "Introduction to Electricity and Optics," McGraw-Hill Book Company, pp. 63-67.

Non-Final Office Action for U.S. Appl. No. 16/146,823 dated Mar. 13, 2020.

\* cited by examiner

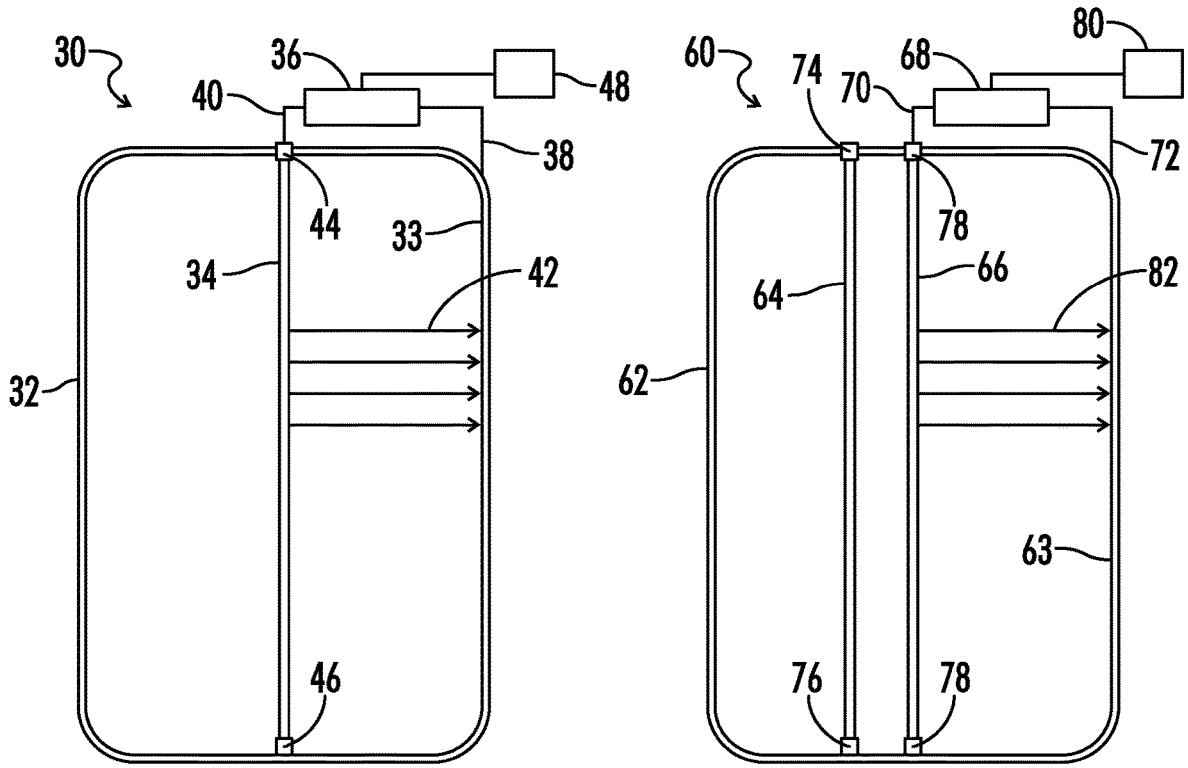
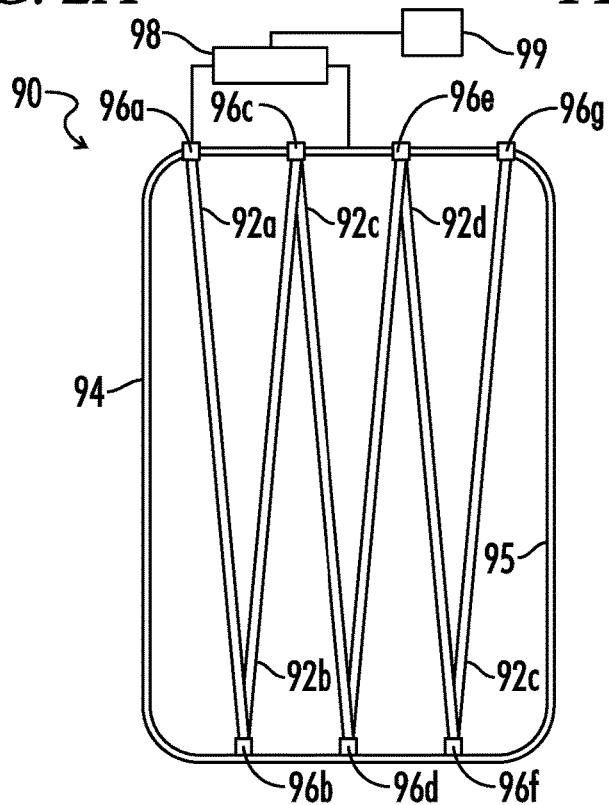
FIG. 2A
FIG. 2B
FIG. 2C

APPARATUS AND METHOD FOR
DETERMINATION OF LIQUID MASS

CROSS REFERENCE TO RELATED
APPLICATION

This application claims priority to U.S. Provisional Patent Application No. 61/952,684, entitled "Method and Apparatus for Determination of Propellant Mass by Capacitance Measurement of Tank Interior" and filed on Mar. 13, 2014, which is incorporated herein by reference.

STATEMENT REGARDING FEDERALLY
SPONSORED RESEARCH OR DEVELOPMENT

This invention was made with Government support under NNM05AA50C awarded by the NASA. The Government has certain rights in the invention.

RELATED ART

Liquid mass gauging in closed vessels where the liquid is in motion has posed a challenge for decades. One example if this situation is liquid fuel in a moving vehicle or in a microgravity environment. Various methods and apparatuses have been introduced in an effort to overcome the obstacles associated with constantly moving or sub-gravity environments, including ultrasonic probes, capacitance probes, point level sensors, and thermal detectors (thermistors, thermocouples, etc.), as well as nuclear devices. All of these devices are limited in their ability to provide accurate measurements irrespective of the fluid orientation. In particular, conventional propellant measuring systems in microgravity environments are the most inaccurate when the propellant mass levels are low or the fuel tank is approaching empty, a time when correct measurements are particularly important. Several devices have been proposed which measure propellant mass within the fuel tank. However, none of these apparatuses provide a low cost and reliable method for determining propellant mass based on averaged measurements of tank capacitance over time.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 2A illustrates an embodiment of a propellant mass detector apparatus comprising one electrode.

FIG. 2B illustrates an embodiment of a propellant mass detector apparatus comprising two electrodes.

FIG. 2C illustrates an embodiment of a propellant mass detector apparatus comprising multiple electrodes.

DETAILED DESCRIPTION

The present disclosure generally pertains to devices and methods for determining liquid mass based on average measurements irrespective of the fluid orientation in a container. In one embodiment, the fluid comprises both a liquid propellant and pressurization gas and/or vapor propellant; however, liquids other than propellants are possible in other methods. The device is useful in detecting fuel masses in tanks where the fuel is in motion, for instance in aircraft or spacecraft (e.g., a microgravity environment). The devices and methods can also be used for determining the liquid in a surface tension screen liquid acquisition device (LAD), and particularly, the incipient breakdown as gas bubbles enter or are formed inside the LAD as the screen dries, as can occur with warm pressurization gases, or with heat transfer into the LAD.

Figure 1:
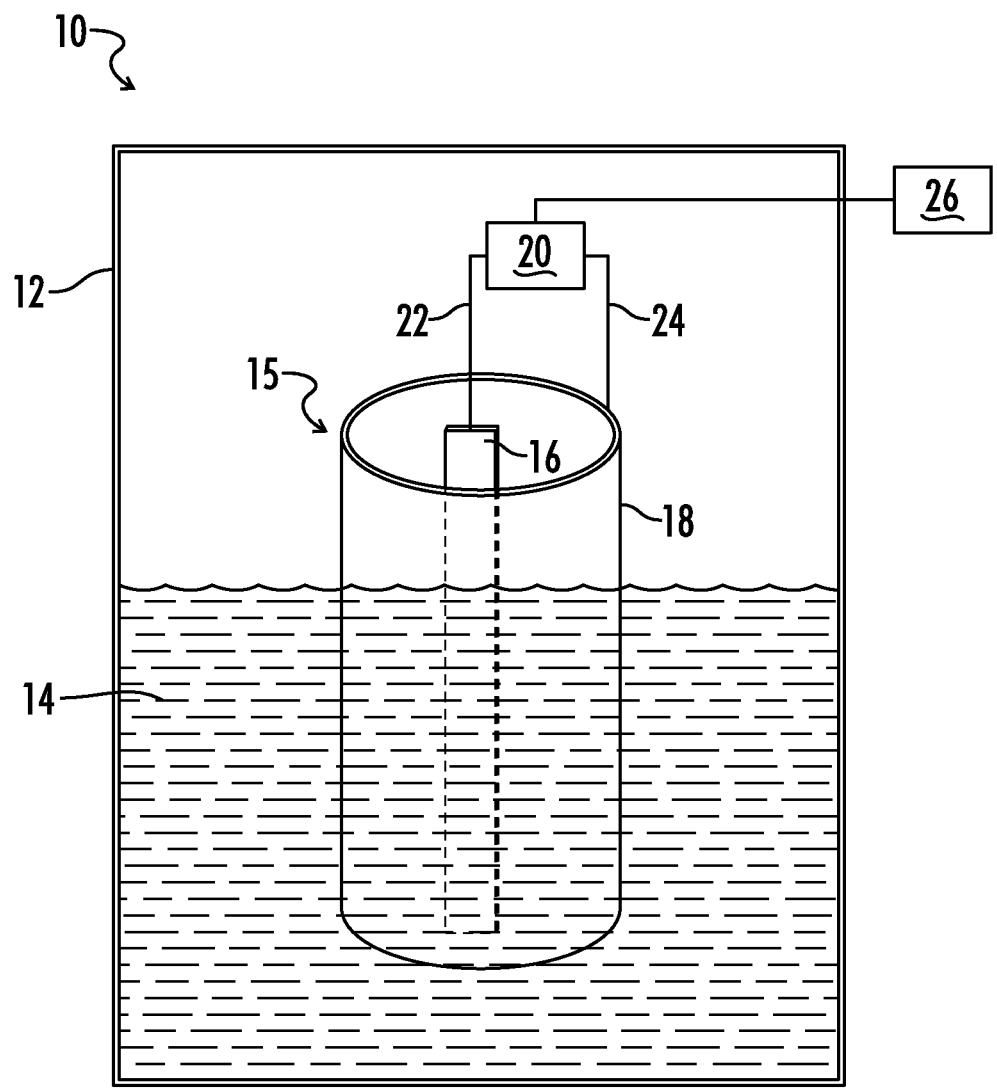
FIG. 1 illustrates a conventional propellant mass detector apparatus which utilizes a capacitance probe detector.

FIG. 1 depicts a conventional liquid mass detector apparatus 10. Apparatus 10 is utilized with a container 12 where the liquid 14 is in motion such that floating sensors are not useful. In one embodiment, the liquid 14 comprises a propellant or fuel and the container 12 comprises a fuel tank. Such tanks 12 may be found, for instance, on aircraft where the fuel 14 may splash or splatter during flight, or in a spacecraft in a microgravity environment. In general, tank 12 comprises a hollow, cylindrical or spherical shaped apparatus for containing a liquid or vapor fuel. The apparatus 10 further comprises a probe 15 which includes an electrode 16 within a hollow metal sleeve 18. In one embodiment the sleeve 18 may comprise an electrically conductive metal, for instance copper, aluminum, etc. Apparatus 10 further comprises a capacitance measuring circuit 20 which is electrically connected to the electrode 16 and the sleeve 18 via electrically conductive wires 22 and 24, respectively. The apparatus 10, including electrode 16, circuit 20 and sleeve 18, is contained within a fuel tank 12. The capacitance detecting circuit 20 continuously detects the capacitance within the tank 12. The capacitance measuring circuit 20 is electrically connected to a computing system 26 which transforms the capacitance measurements to the corresponding liquid mass. The computing system will be described in further detail herein. The capacitance measurements may be used to calculate the mass of the propellant within the tank, for example through the use of algorithms that are generally known in the art. In one example, with the capacitance probe having one half its full capacitance, the tank is half full. As a result, a change in the capacitance measured within the fuel tank is directly proportional to a change in the fuel level, i.e., the capacitance will decrease as the mass of the propellant decreases.

Although the conventional apparatus 10 exemplified in FIG. 1 addresses some of the issues related to measuring liquid mass, for instance a propellant, in environments where the liquid may move, the apparatus 10 still has disadvantages. In low gravity or microgravity situations, conventional propellant mass measuring devices suffer from accuracy problems especially when the level of the fuel is low (which is when accuracy is typically most important). In addition, the propellant tends to vaporize and increase the pressure inside the fuel tank in a microgravity environment. The vapor must be periodically vented, potentially causing a loss of propellant that is difficult to account for, which leads to additional uncertainty of available propellant.

FIGS. 2A-C illustrate embodiments of a propellant mass detector apparatus in accordance with the present disclosure. The detectors 30, 60 and 90 ensure that propellant mass measurements are made that accurately determine the liquid mass regardless of how the liquid is oriented within the tank. Referring to FIG. 2A, apparatus 30 includes an electrically conductive, hollow structure for holding liquid, for instance a fuel tank 32. The tank 32 defines a space in which the propellant (not shown) and an electrode 34 are disposed. Electrode 34 is formed, for example, by thin rods, thin wires, plates or screens. In one embodiment, the electrode 34 is a small, thin rod or plate of negligible weight as compared to the weight of the tank 32. The electrode 34 is supported within the tank 32 by one or more insulators 44 and 46 which prevent the electrode 34 from electrically contacting the walls 33 of the tank 32. Apparatus 30 further includes a capacitance measuring circuit 36 which is conductively coupled to the electrode 34 via wire 40 and the wall 33 of the tank 32 via wire 38. Apparatus 30 functions to measure the capacitance between the electrode 34 and the wall of the tank 32. The arrows 42 represent the lines of electric field intensity. The tank 32 is grounded, and a capacitance between the tank 32 and electrode 34 may be measured and used to determine the mass of the propellant within the tank.

Figure 13:
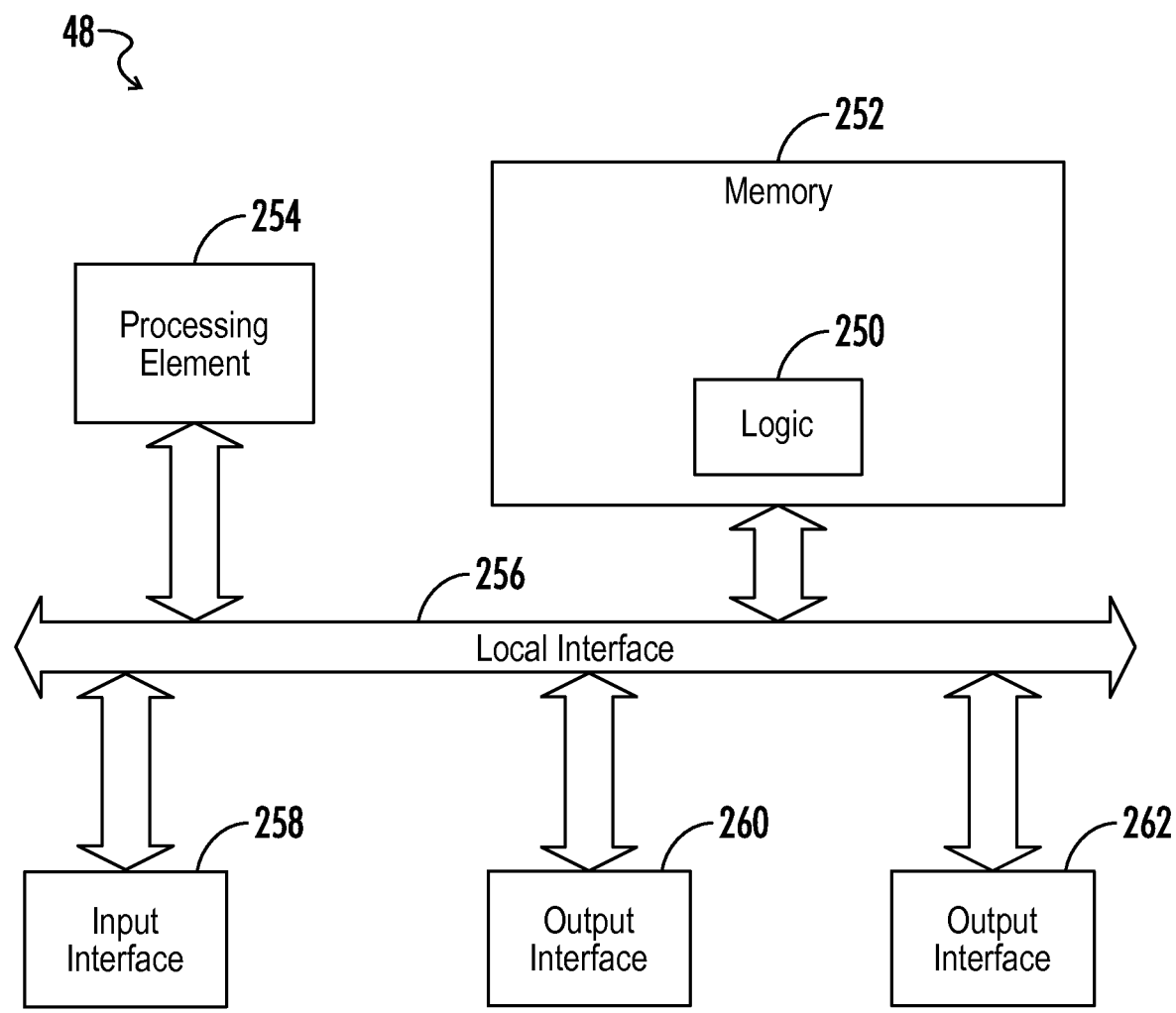
FIG. 13 is a block diagram showing an embodiment of a computing device for determining the mass of a liquid.

The capacitance measuring circuit 36 is electrically connected to a computing system 48 which transforms the capacitance measurements to a propellant mass. Algorithms useful in determining the propellant mass from the capacitance measurements are generally known in the art. The computing system 48 can be implemented in software, hardware, firmware or any combination thereof. FIG. 13 shows an embodiment of a computing system 48. Computing system 48 can include logic 250, referred to herein as "computing logic," for generally controlling the operation of the computing system 48. In the computing system 48 shown in FIG. 13, the computing logic 250 is implemented in software and stored in memory 252 of the computing system 48. Note that the computing logic 250, when implemented in software, can be stored and transported on any computer-readable medium for use by or in connection with an instruction execution apparatus that can fetch and execute instructions.

The computing system 48 can include at least one conventional processing element 254, which has processing hardware for executing instructions stored in memory 252. As an example, the processing element 254 may include a central processing unit (CPU) or a digital signal processor (DSP). The processing element 254 communicates to and drives the other elements within the computing system 48 via a local interface 256, which can include at least one bus. Furthermore, an input interface 258 is configured to receive data indicative of capacitance measurements from a capacitance measuring circuit. Note that the input interface 258 may be coupled to the capacitance measuring circuit for communication by a conductive or optical medium, or the input interface 258 may communicate with the capacitance measuring circuit wirelessly. An output interface 260, for example, a printer, a gauge, a liquid crystal display (LCD) or other display apparatus, can be used to output data to the user, such as a measurement of an amount of fuel in the tank 32. The computing system 48 also has the capability to determine off-nominal conditions, such as noise, loss of electrical continuity, etc.

FIG. 2B illustrates an additional embodiment of an apparatus 60 for determining the mass of a liquid in a container, for example a propellant in a fuel tank. The apparatus includes an electrically conductive, hollow structure for containing a liquid propellant, for instance a fuel tank 62. The tank 62 defines a space in which a propellant (not shown) and two electrodes 64 and 66 are disposed. Like the embodiment illustrated in FIG. 2A, the electrodes 64 and 66 can be small, thin and of negligible weight as compared to the weight of the tank 62. Electrodes 64 and 66 are supported within fuel tank 62 by one or more insulators 72, 74, 76 and 78 that prevent the electrodes 64 and 66 from electrically contacting the walls 63 of the tank 62. A capacitance measuring circuit 68 is conductively coupled to the electrodes 84 and 66 via wire 70 and the wall 63 of the tank 62 via wire 72. Arrows 82 represent the electric field intensity. Apparatus 60 allows for a grounded tank 62, and a capacitance between the tank 12 and at least one electrode 84 and 66 may be measured and used to determine the mass of the propellant within the tank 62. The capacitance measuring circuit 68 is electrically connected to a computing system 80 which transforms the capacitance measurements to a propellant mass. Algorithms useful in determining the propellant mass from the capacitance measurements are generally known in the art.

FIG. 2C illustrates an additional embodiment of an apparatus 90 comprising multiple electrodes 92a-92e. Like the embodiments described above in reference to FIGS. 2A and 2B, the apparatus includes an electrically conductive, hollow container for holding a liquid or vapor substance, for instance a propellant in a fuel tank 94. The tank 94 defines a space in which the propellant (not shown) and electrodes 92a-92e are disposed. Each of the electrodes is coupled to the tank 94 via insulators 96a-96g, which prevent the electrodes 92a-92e from electrically contacting the walls 95 of tank 94. The electrodes may be positioned within the tank 94 in a variety of positions. The grounded electrodes 96a-96g produce an electrical charge, and a capacitance between any of the electrodes and tank may be measured by the capacitance measuring circuit 98. This capacitance may be used to calculate the mass of propellant within tank 94. The capacitance measuring circuit 98 is electrically connected to a computing system 99 which transforms the capacitance measurements to a measurement of propellant mass. Algorithms useful in determining the propellant mass from the capacitance measurements are generally known in the art.

The embodiment illustrated in FIG. 2C illustrates six electrodes. However, other numbers of electrodes, for instance two or more, are possible in other embodiments. In addition, certain hardware typically present in propellant tanks may also serve as grounded surfaces or charged surfaces for determining the capacitance; such hardware includes liquid acquisition devices (LADs), pressurization gas tanks or bottles, anti-slosh baffles, support structures, etc.

Figure 3A:
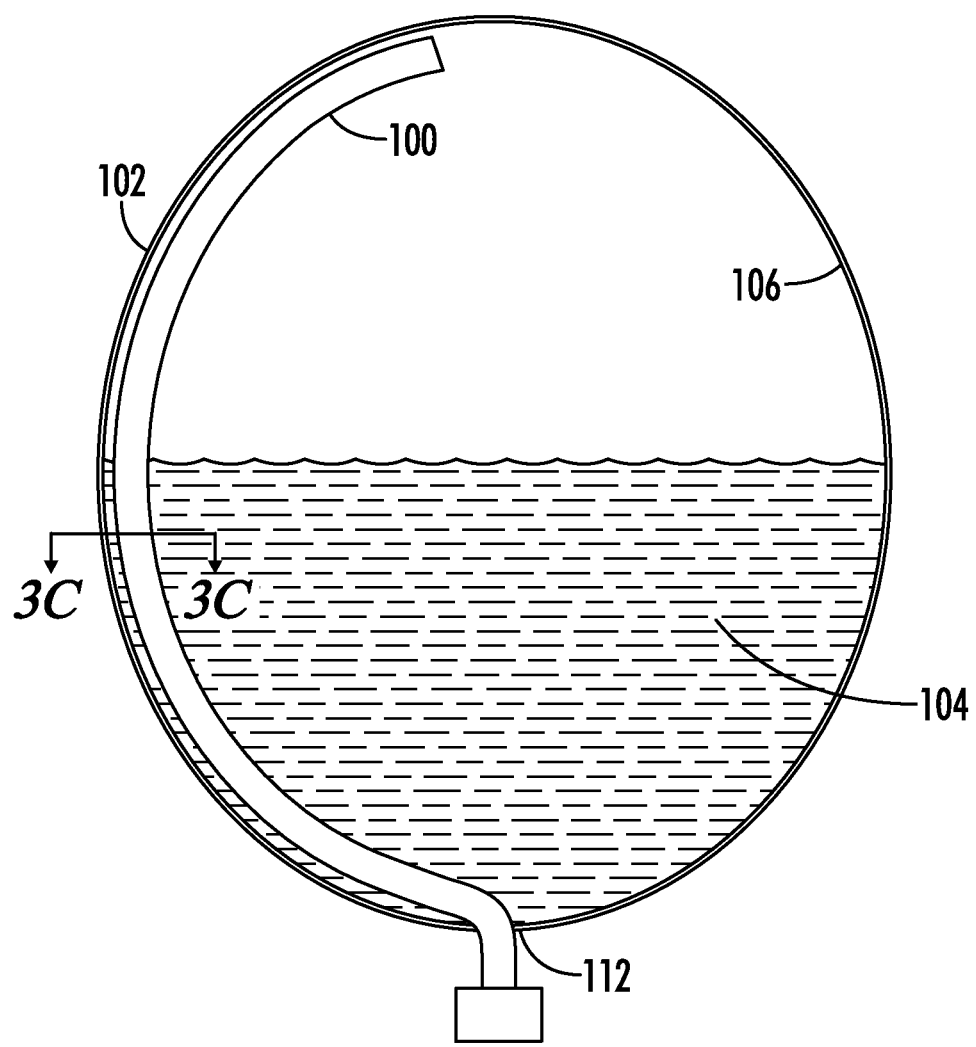
FIG. 3A illustrates a cross sectional view of a conventional liquid acquisition device positioned within a fuel tank.
Figure 3B:
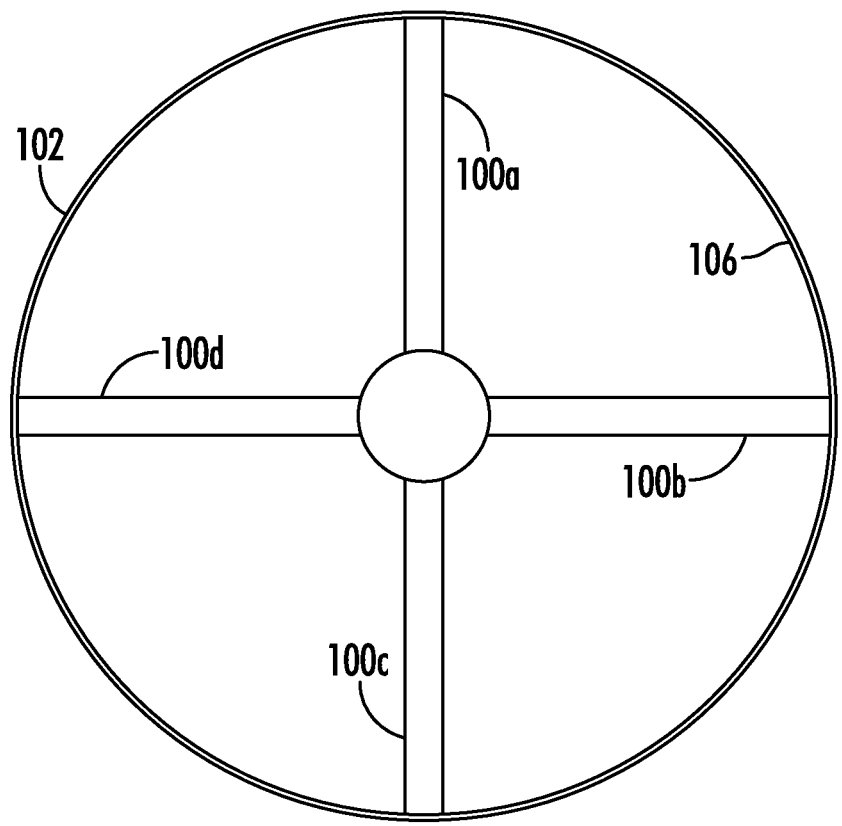
FIG. 3B illustrates a top view of a plurality of conventional liquid acquisition devices placed within a fuel tank.
Figure 3C:
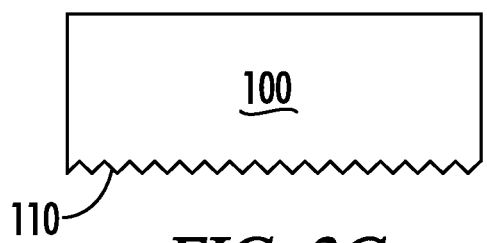
FIG. 3C illustrates a cross sectional view of the conventional liquid acquisition device illustrated in FIG. 3A, taken along line 3C-3C.

Liquid acquisition devices (LADs), also referred to as capillary acquisition devices, are often used in low gravity environments to direct fuel out of tanks where the liquid is not centered over the tank outlet. One of the most common types of LADs is a screen channel device. FIGS. 3A, 3B and 3C illustrate conventional LADs. As illustrated in FIG. 3A, a screen channel LAD is a flexible or rigid hollow tube-like structure 100 which defines an outlet port 112. The LAD 100, when positioned inside of the fuel tank 102, often follows the interior contours of the tank. The LAD 100 may comprise a number of orientations, for example, round, rectangular or triangular. With reference to FIG. 3B which illustrates a top view of a fuel tank, four LADs 100a-100d (one per quadrant) are generally positioned within the tank 102. The LADs 100a-100d are positioned in this manner to so that one or more of the LADs 100a-100d is in contact with any liquid propellant 104 (FIG. 3A) which has migrated along the tank wall 106 in one of the embodiments. Liquid 104 located throughout the tank flows into the LAD 100 and then out through the tank outlet 112.

Figure 4:
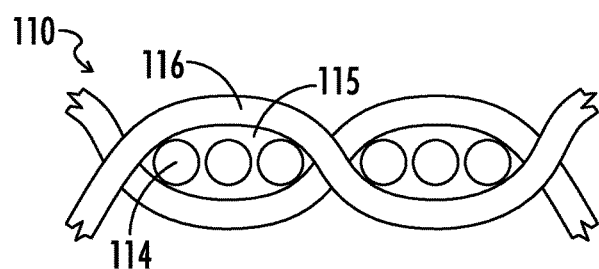
FIG. 4 illustrates an embodiment of the screen of a liquid acquisition device.

FIG. 3C illustrates a cross-sectional view of the LAD 100 shown in FIG. 3A along line 3C-3C. At least a portion of the surface of the LAD 100 comprises a liquid permeable surface tension screen 110. Screen 110 is generally positioned on the side of the LAD 100 closest the fuel tank wall 106 (FIG. 3A). With reference to FIG. 4, the surface tension screen 110 comprises a liquid permeable woven material 116 with interwoven fibers 115. Spaces or openings 115 are interspersed between the woven material 116 and fibers 115, allowing propellant to enter the LAD 100. Typical materials used for propellant LADs include aluminum, various stainless steels, etc. Referring again to FIGS. 3C and 4, the screen 110 allows propellant 104 which has migrated along the wall 106 to be drawn into the LAD 100 through the screen 110. The increased pressure within tank 102 forces the propellant 104 into the LAD 100 where it is directed towards the exit port 112 of the tank (FIG. 3A). As outflow of fuel begins in a microgravity environment, surface tension forces within the weave material 116 block the outflow of propellant vapor and/or pressurization gas and allow the passage of propellant liquid 104 into the LAD 100. The LAD allows for the propellant to be directed towards the exit port 112, even in microgravity environments.

Although the LADs described in FIGS. 3A, 3B, 3C and 4 are useful in directing fuel flow in microgravity environments, they do present problems in determining the propellant mass in the fuel tank. Capacitance mass measurement devices positioned within the fuel tank, but outside the LAD, will accurately detect the propellant present in the tank but will not detect the propellant within the LAD that is travelling to the exit port, resulting in inaccurate fuel readings.

Figure 5:
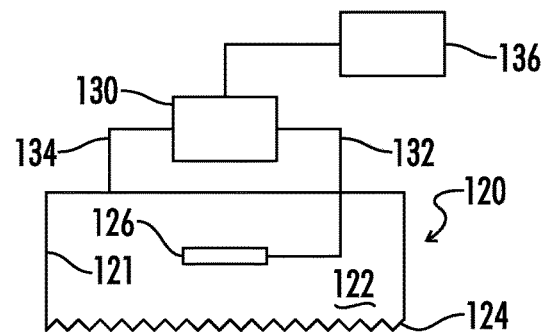
FIG. 5 is a cross sectional view of the liquid acquisition device of FIG. 7B taken along line 5-5 and including a capacitance measuring circuit.
Figure 6:
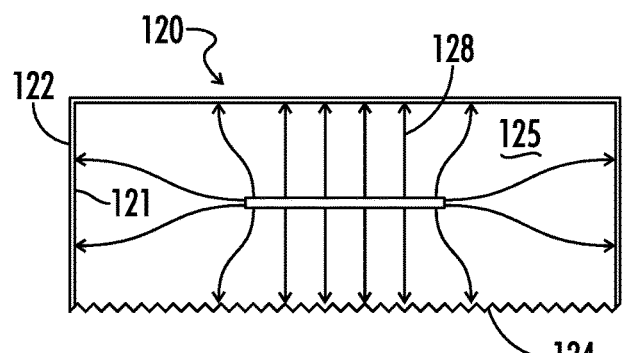
FIG. 6 is a cross sectional view of the liquid acquisition device of FIG. 7A taken along line 6-6 and including an electrode.

FIGS. 5 and 6 illustrate a cross section of one embodiment of a LAD 100 taken along lines 5-5 and 6-6, respectively. In one embodiment, the LAD 100 comprises a hollow tube which defines a space. Although the LAD illustrated in FIGS. 5 and 6 is rectangular, other shapes may be possible in other embodiments, such as cylindrical. The LAD comprises a specially formed metal so that the LAD may be disposed in and conform to the contours of the interior of an electrically conductive, hollow structure defining a space, for instance a tank for holding fuel (not shown). In an additional embodiment, at least a portion of the hollow structure 122 comprises a surface tension screen 124 which is generally positioned on the side of the LAD 120 closest to the wall of the fuel tank (not shown). Referring again to FIG. 6, the hollow tube LAD 120 defines a space 122 in which an electrode 126 is disposed. In one embodiment, the electrode may comprise a stainless steel plate. The electrode 126 is positioned, in one embodiment, at the approximate center of the structure space 122 and extends through the length of the LAD 120. The LAD 120 can be electrically insulated or grounded, but preferably it is grounded with the inner electrode entering the LAD 120 through an insulator. Representative field lines 128 illustrate the edge effect (FIG. 6). Referring to FIG. 5, a capacitance measuring circuit 130 is electrically connected to the electrode 126 and the wall of the LAD 122 via wires 132 and 134, respectively. The capacitance measuring circuit 130 is electrically connected to a computing system 136 which transforms the capacitance measurements to a measurement of liquid mass. The capacitance of the interior space of the LAD 120 may be measured and the mass of propellant within the LAD 120 calculated based upon these measurements. Algorithms useful in determining the propellant mass from the capacitance measurements are generally known in the art. The use of the electrode and the capacitance measuring circuit allows for the determination of the mass of liquid within the LAD.

Figures 7A, 7B:
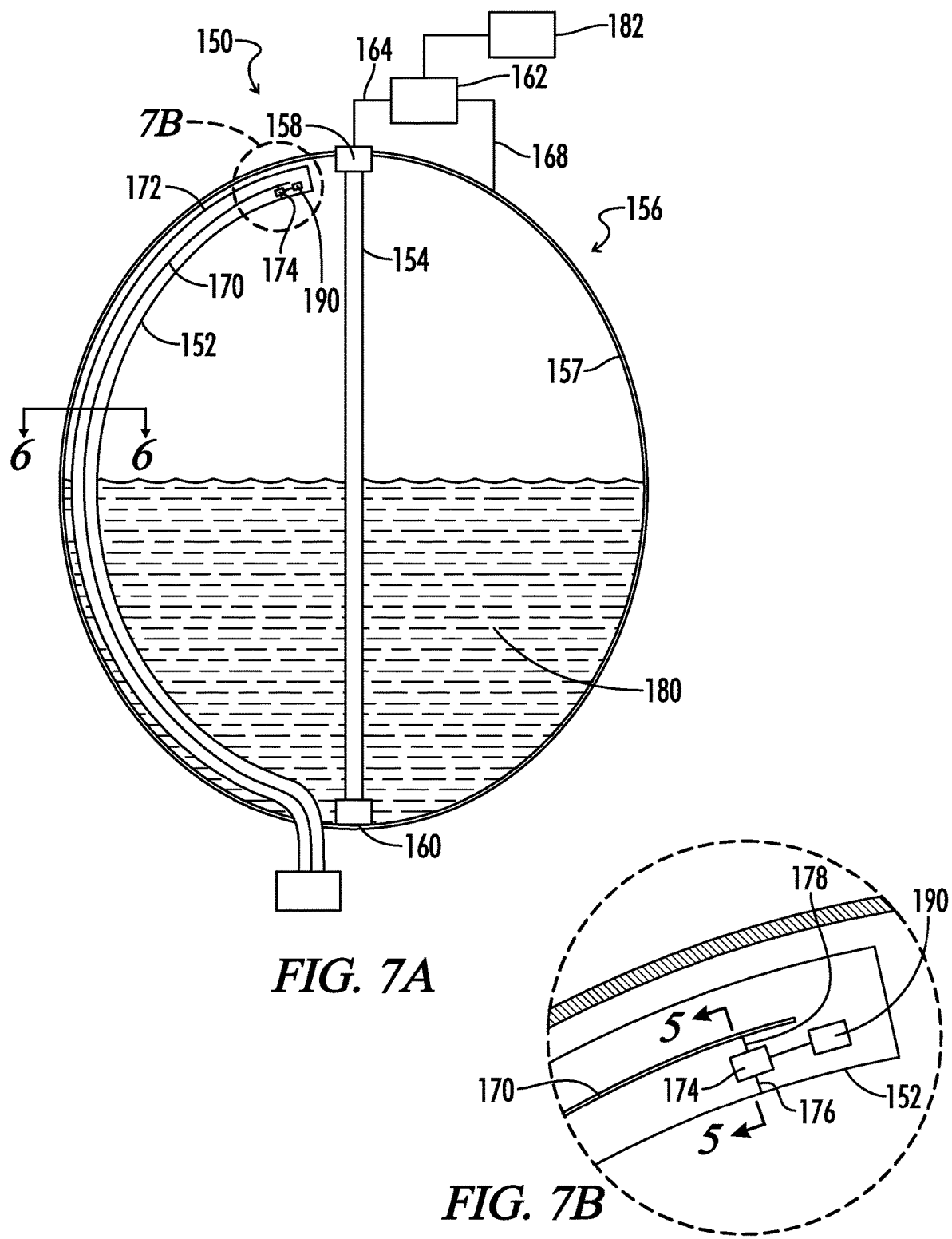
FIG. 7A illustrates an embodiment of a propellant mass detector comprising an electrode and a liquid acquisition device.
FIG. 7B is a detailed view of the capacitance measuring circuit of FIG. 7A

FIG. 7A illustrates one embodiment of an apparatus 150 of the present disclosure which includes both at least one electrode 154 and at least one LAD 152. In one embodiment, the apparatus 150 comprises an electrically conductive, hollow structure for holding a liquid or vapor propellant 180, for instance a fuel tank 156. In an additional embodiment, the fuel tank 156 defines a space into which one or more LADs 152 and one or more electrodes 156 are disposed, as will be described in more detail herewith.

Referring again to FIG. 7A, an electrode 154 is disposed with the space defined by tank 156. This electrode 154 is similar to the electrode depicted in FIG. 2A. Specifically, electrode 154 is formed, for example, by thin rods, thin wires, plates or screens and supported within fuel tank 156 by one or more insulators 158 and 160 which prevent the electrode 154 from touching the walls 157 of the fuel tank 156. Although FIG. 7A illustrates a single electrode 154, other numbers of electrodes 154 may be included within tank 156 in other embodiments, for instance two or more electrodes. As illustrated in FIG. 7A, a capacitance measuring circuit 162 is conductively coupled to the electrode 154 via wire 164 and the wall 157 of the tank 156 via wire 168. The capacitance measuring circuit 162 is electrically connected to a calculating unit 182 which transforms the capacitance measurements to a propellant mass.

Turning again to FIG. 7, a LAD 154 is disposed with the space defined by tank 156. The LAD 154 is similar to the LAD depicted in FIGS. 5 and 6. Specifically, the LAD 154 comprises a flexible or rigid hollow tube structure with a surface tension screen 172 which is generally positioned on the side of the LAD 152 closest the fuel tank 157. A stainless steel electrode 170 is positioned within the LAD 152 at the approximate center and runs the length of the LAD 152; other conducting metals or materials be used in other embodiments. Referring now to FIG. 7B, a capacitance measuring circuit 174 is electrically connected to the electrode 170 and the wall of the LAD 170 via wires conductive wires 176 and 178, respectively. The capacitance measuring circuit 174 is electrically connected to a computing system 190 which transforms the capacitance measurements to a measurement of propellant mass. LAD 152 is positioned on the interior of the fuel tank 156 and is positioned to follow the interior contours of the walls 157 of tank 156. Although FIG. 7A illustrates one LAD 152 included within tank 156, other numbers of LADs 152 may be present in the tank 156 in other embodiments, for example two or more LADs. In one embodiment, four LADs 152, positioned one per quadrant similar to the configuration illustrated in FIG. 3B, may be positioned within tank 156.

The electrode 154 and the capacitance measuring circuit 162 function to detect the capacitance within the entirety of the fuel tank 156. In this embodiment, the capacitance of the interior space of the LAD 152 may be measured by use of the metal electrode 170 and the capacitance measuring circuit 174. Additionally, the capacitance within the fuel tank 156 may be measured by use of the electrode 154 and the capacitance measuring circuit 162. These capacitance measurements may be used to determine the total mass of propellant located both within the LAD and on the interior of the fuel tank 156 through computing systems 182 and 190. Algorithms useful in determining the propellant mass from the capacitance measurements are generally known in the art. Apparatus 150 allows for the measurement of the total mass of the propellant 180 within the tank 156, regardless of the position of the propellant. This is particularly useful in micro-gravity environments, when the propellant may migrate along the walls 157 of the tank 156, and where an LAD 170 is used to direct propellant 180 to the vehicle engine (not shown). The total mass of propellant 180 present within tank 156 may then be determined by summing or otherwise combining the calculated masses within the tank 156 and the LAD 152.

In an additional embodiment, the electrode described in reference to FIGS. 2A-2C and the electrodes described with reference to the LADs in FIGS. 5-7 may cause agitation of the liquid propellant via electrostatic forces (electrohydrodynamics). The development of vapor bubbles within the LAD can damage the engine and cause potentially dangerous operating conditions. Stirring or agitating the liquid, particularly within the screen devices found in an LAD, reduces temperature stratification and condenses vapor bubbles. Vapor bubbles may occur with cryogenic propellants, especially liquid hydrogen, but also liquid oxygen, fluorine, etc.

Figure 14:
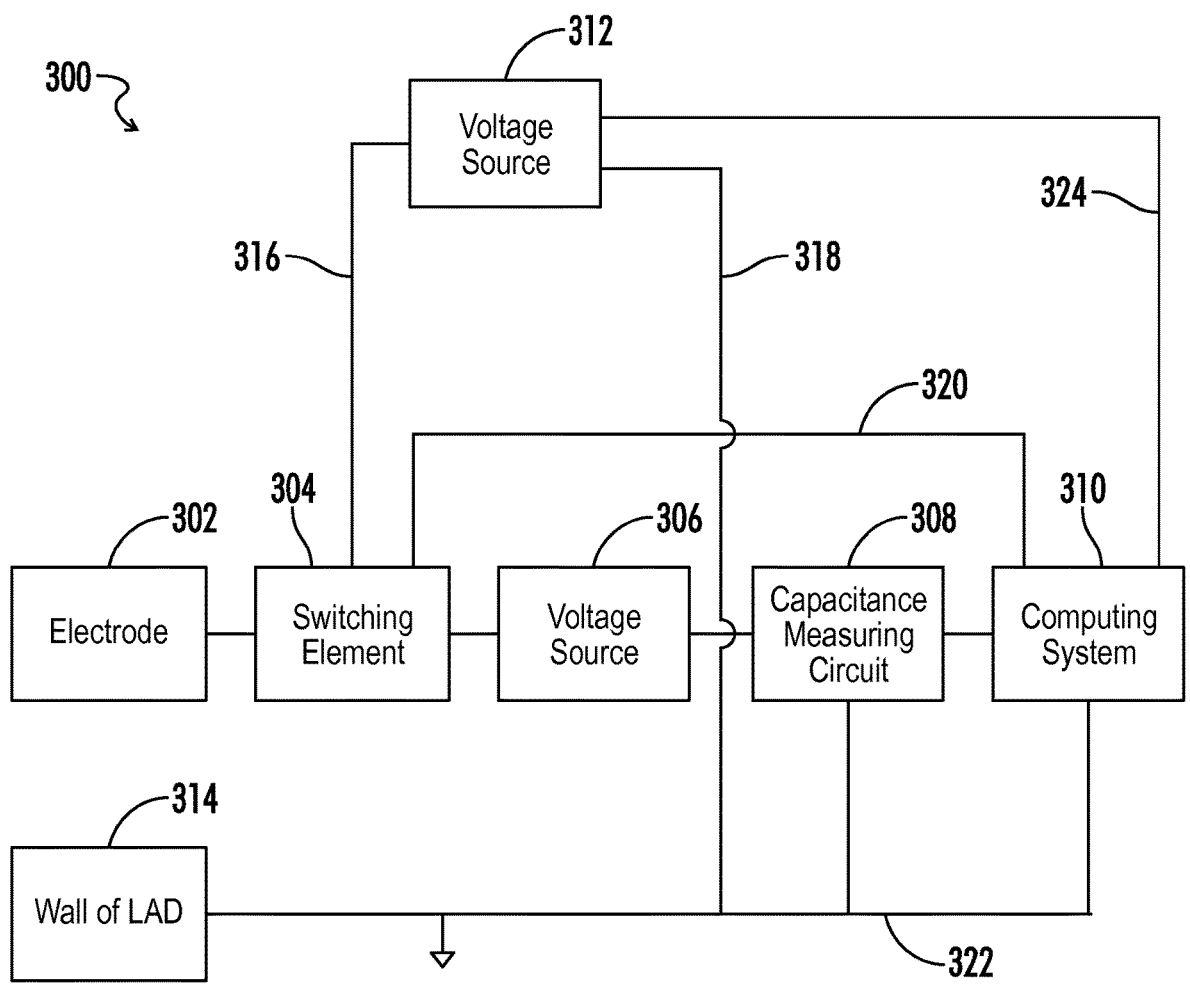
FIG. 14 is a block diagram showing an embodiment of a system for eliminating vapor bubbles in a fuel tank or a LAD.

FIG. 14 illustrates an embodiment of a system 300 for eliminating vapor bubbles in a fuel tank or a LAD. In this embodiment, the electrode 302 within a LAD (not shown in FIG. 14) is conductively coupled to a switching element 304, a LAD voltage source 306, a capacitance measuring circuit 308 and a computing system 310. In addition, the wall of the LAD 314 is conductively connected to the capacitance measuring circuit 308 via wire 322, which may be connected to ground. As described previously, the LAD voltage source 306 provides a voltage to the LAD electrode 302 that in turn produces a measurable capacitance between the LAD electrode 302 and the wall of the LAD 314. System 312 further includes a second voltage source 312 that is electrically connected to the switching element 304 via wire 316 and the computing system 310 via wire 324. The computing system 310 provides a control signal to the switching element 304 for controlling the state of the switching element. Specifically, in normal operation, the switching element 304 electrically connects the electrode 302 to the LAD voltage source 306 and electrically isolates the electrode 302 from the voltage source 312. When a sufficiently large bubble is detected in the LAD based on a capacitance measurement by the computing system 310, the computing system 310 provides a control signal to the switching element 304 via the wire 320 in order to transition the switching element 304 to a state for electrically connecting the electrode to the voltage source 312 and electrically isolating the electrode 302 from the LAD voltage source 306. The switching element 304 may be implemented by a relay or at least one switch for selectively connecting either the LAD voltage source 306 or the voltage source 312 to the electrode 302.

Note that there are variety of techniques that can be used to detect a bubble in the LAD. In one embodiment, the computing system 310 may detect a sudden or large change in capacitance, for instance a large drop in the capacitance indicating the presence of a bubble in the LAD (not shown in FIG. 14). For example, when the measured capacitance falls below a predefined threshold, the computing system 310 may control the switching element 304 such that the voltage source 312 is electrically connected to the electrode 302 instead of the LAD voltage source 306 for at least a predetermined amount of time at which time the switching element 304 may be transitioned to its original state for connecting the LAD voltage source 306 to the electrode 302. The voltage of the voltage source 312 is significantly different (e.g., higher) than the voltage of the voltage source 306 such that, by transitioning connectivity from the LAD voltage source 306 to the voltage source 312, the fluid in the LAD is stirred by electrostatic forces from the electrode 302 or otherwise. Specifically, the increased voltage from the voltage source 312 produces electrostatic forces on the edges of any vapor bubbles within or near the path between the space between the electrode and the wall 314 of the LAD. This causes movement and the subsequent condensation of the bubbles, reducing temperature stratification in the liquid and eliminating the bubble.

Figure 15:
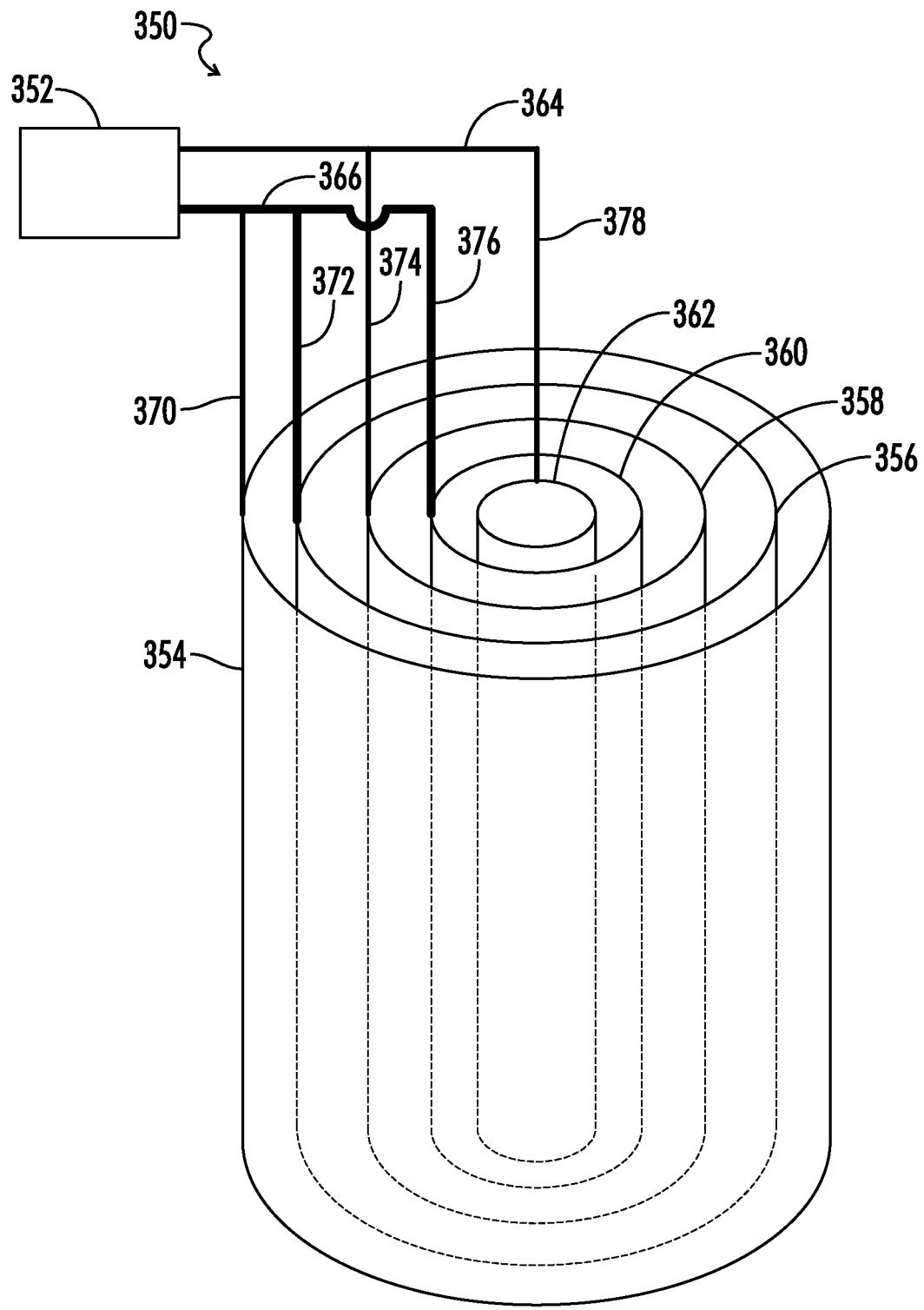
FIG. 15 illustrates an embodiment of propellant mass detector comprising a series of mesh screens.

In an additional embodiment, FIG. 15 illustrates an apparatus 350 that includes multiple screens 356, 358, 360 and 362 positioned within a fuel tank 354. Although the embodiment exemplified in FIG. 15 includes four screens, other numbers of screens are possible in other embodiments. The screens 356, 358, 360 and 362 are constructed from a course or fine mesh electrically conductive material, for instance aluminum or stainless steel, and are fabricated to be very thin, though other types of screens are possible in other embodiments. The weight of screens 356, 358, 360 and 362 is therefore a small percentage of the overall weight of the fuel tank 354. In the embodiment illustrated in FIG. 15, screens 356, 358, 360 and 362 have a hollow cylindrical configuration that mimics the contours of tank 354. Screens 356, 358, 360 and 362 have increasingly smaller diameters so that one screen may be positioned within the hollow interior of a neighboring screen. That is, the screens 356, 358, 360, and 362 are in a concentric arrangement. For example, cylindrical screen 356 has a diameter that is smaller than the diameter of the tank 354 so that screen 356 may be positioned within tank 354, while cylindrical screen 358 has a diameter that is smaller than screen 356 so that it may be positioned within the interior of screen 356, etc. Each of screens 356, 358, 360 and 362 is electrically connected to a capacitance measuring circuit 352 via wires 372, 374, 376 and 378, respectively. In addition, the capacitance measuring circuit 252 is electrically connected to the wall of tank 354 via wire 370. In this embodiment, the wall of tank 354, screen 356 and screen 360 are grounded. The capacitance measuring circuit 352 measures the capacitance between each of the screens (e.g., the capacitance between screen 362 and screen 360; the capacitance between screen 360 and 358, etc.) as well as the capacitance between screen 356 and the wall of the tank 354. The mass of liquid, for example propellant, in tank 354 may be computed by a computing system (not shown in FIG. 15) as described previously. In this regard, the total mass of liquid in the tank is the sum of the mass liquid detected between each of the screens (e.g., the mass between screen 362 and screen 360; the mass between screen 360 and 358, etc.) as well as the mass between screen 356 and the wall of the tank 354. The configuration of the apparatus 350 as illustrated in FIG. 15 allows for a more accurate determination of propellant mass when there is little propellant remaining in the tank 354, or in situations where the propellant is distributed unevenly throughout the tank 354 and the tank walls.

In an additional embodiment, the present disclosure is directed to a vehicle including a fuel tank as described herewith. In this embodiment, the vehicle may be, for example, a car, truck, sea vessel or space vehicle in which the fuel or propellant or other liquid may move during use, making the measurement of the fuel mass difficult. Fuel or propellant is drawn from the fuel and/or oxidizer tank and used by an engine or turbine to generate thrust for the vehicle. In this embodiment, an electrode is positioned within the fuel tank. A capacitance measuring circuit is electrically connected to the electrode and the wall of the tank and measures the capacitance between the electrode and the wall of the tank. In addition, a computing system is electrically connected to the capacitance measuring device. The computing system converts the measurements received from the capacitance measuring device to a measurement of fuel mass. In an additional embodiment, the tank may further comprise a hollow LAD which includes an electrode disposed in its interior. A capacitance measuring circuit is electrically connected to the electrode and the wall of the LAD and measures the capacitance between the electrode and the wall of the LAD. A capacitance gauge can also be provided with an isolating switch, such that the gauge is not subjected to the moderate voltages used to stir the liquid, to remove vapor bubbles that may form, especially within the LAD. In addition, a computing system is electrically connected to the capacitance measuring device which converts the measurements received from the capacitance measuring device to a measurement of fuel mass. The fuel mass measurements from the electrode and the LAD may be summed or otherwise combined to determine the total mass of fuel remaining in the tank.

Figure 12:
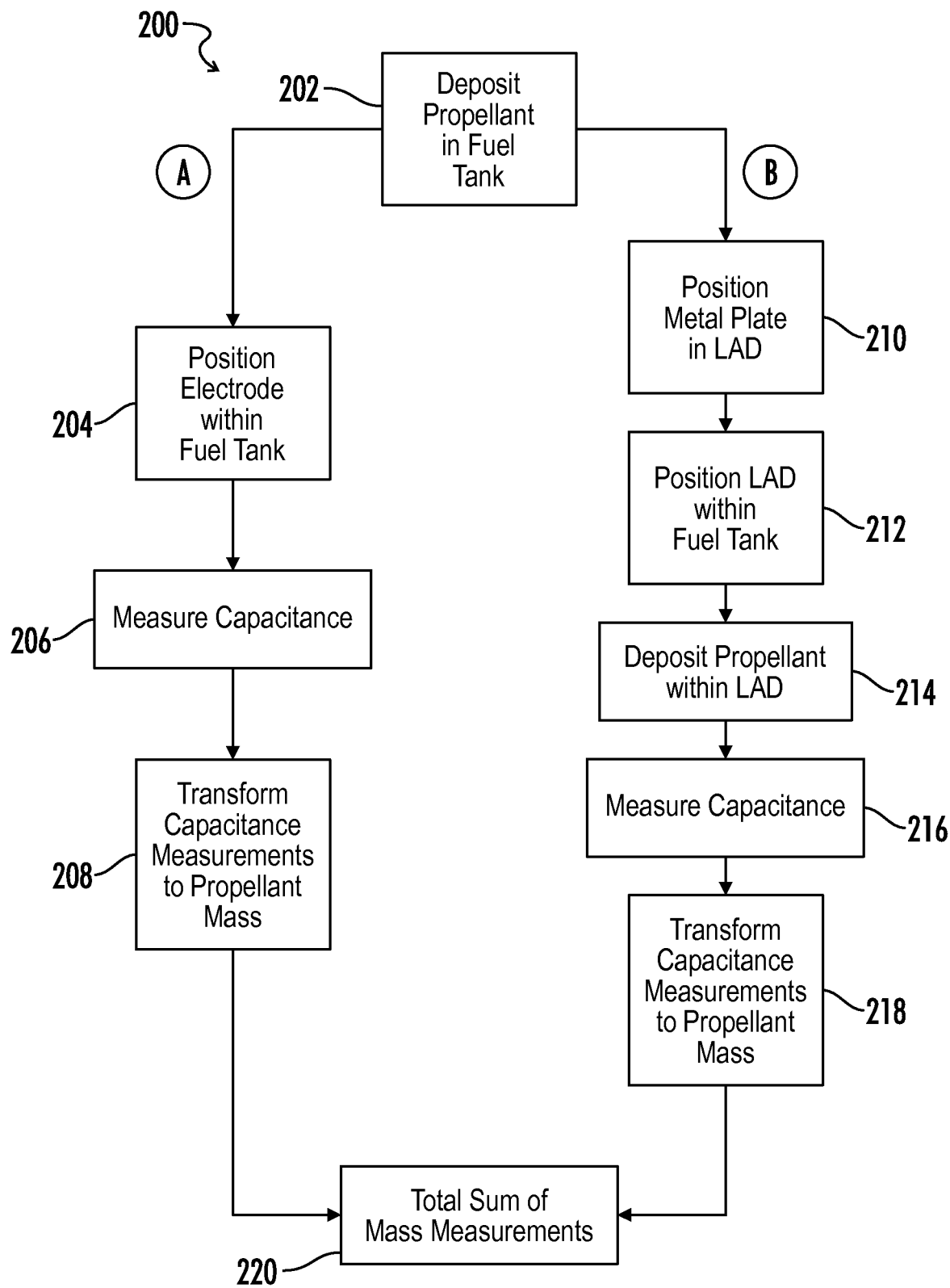
FIG. 12 is a flow chart illustrating an exemplary method of determining the mass of a liquid in a container.

In an additional embodiment, the present disclosure is directed to a method of calculating the mass of a propellant in a fuel tank. This method is illustrated in side A of FIG. 12. Referring now to FIG. 12, a propellant is deposited into an electrically conductive hollow structure, for example a fuel tank, as shown by block 202. In this embodiment, the fuel tank is electrically connected to a capacitance measuring circuit. In an additional embodiment, the capacitance measuring circuit is further connected to a computing system which may transform the capacitance measurements to a measurement of propellant mass. Algorithms for making these calculations are generally known in the art, such as those for calibrating a system with known amounts of fluid, analytically determining the capacitance as a function of the volume or mass and dielectric constant, etc. The propellant may comprise, for example, a liquid fuel. At least one electrode is positioned within the hollow fuel tank, as shown by block 204. Such electrodes are described previously in reference to FIGS. 2A, 2B and 2C. In one embodiment, multiple electrodes, for instance two or more electrodes, may be positioned within the tank, as illustrated in FIGS. 2B and 2C. The one or more electrodes are electrically connected to the capacitance measuring circuit. Note that multiple measurements over time can be averaged or otherwise combined to provide a capacitance measurement that is transformed into a measurement of mass of propellant or other liquid in the tank. The capacitance between the one or more electrodes and the wall of the fuel tank is measured with the capacitance measuring circuit, as illustrated in block 206. The capacitance measurements are transformed into a measurement of the mass of propellant within the tank at block 208.

In an additional embodiment of the present disclosure, the method 200 may also include measuring the mass of a liquid, for instance a propellant, in a liquid acquisition device (LAD), such as is commonly used in fuel tanks with a microgravity environment. This portion of the method is illustrated in side B of FIG. 12. Referring again to FIG. 12, the method comprises the positioning of an electrode within an electrically conductive tube, i.e., the LAD, as illustrated at block 210. In this embodiment, both the electrode and a wall of the LAD are electrically connected to a capacitance measuring circuit (see FIG. 5). The capacitance measuring circuit is electrically connected to a computing system which may transform the capacitance measurements to a measurement of propellant mass. Algorithms for making these calculations are generally known in the art. As illustrated in block 212, the LAD is positioned with a fuel tank, for example the same tank in which the electrode of steps 204 through 208 is positioned. A liquid, for instance a propellant is then positioned within the LAD as illustrated in block 214. This propellant may comprise, for instance, a liquid fuel. Propellant will travel into the tube as a result of increasing pressure within the fuel tank, as was described in detail in reference to FIGS. 5 and 6. The capacitance between the electrode and the wall of the LAD is measured by the capacitance measuring circuit at block 216. Note that multiple measurements over time can be averaged or otherwise combined to provide a capacitance measurement that is transformed into a measurement of mass of propellant or other liquid in the tank. The capacitance measurements are transformed into a measurement of the mass of propellant within the tank at block 218.

The methods illustrated in sides A and B may be performed separately, or may be performed consecutively to determine the total mass of propellant in a fuel tank which utilizes a LAD. In this embodiment, the sum of the propellant mass in the fuel tank (side A) and the LAD (side B) may be determined.

EXPERIMENTAL

Analysis/Experiment 1: Rectangular Flat Plate Configuration

The simple parallel, rectangular flat plate configuration illustrates that capacitance as a function of orientation agrees to within about 0.4 to 0.8% for the worst case condition of 50% fill. This degree of accuracy is generally considered very good for propellants, especially by comparison with the far higher uncertainties of conventional devices used in micro-gravity environments.

Figure 8:
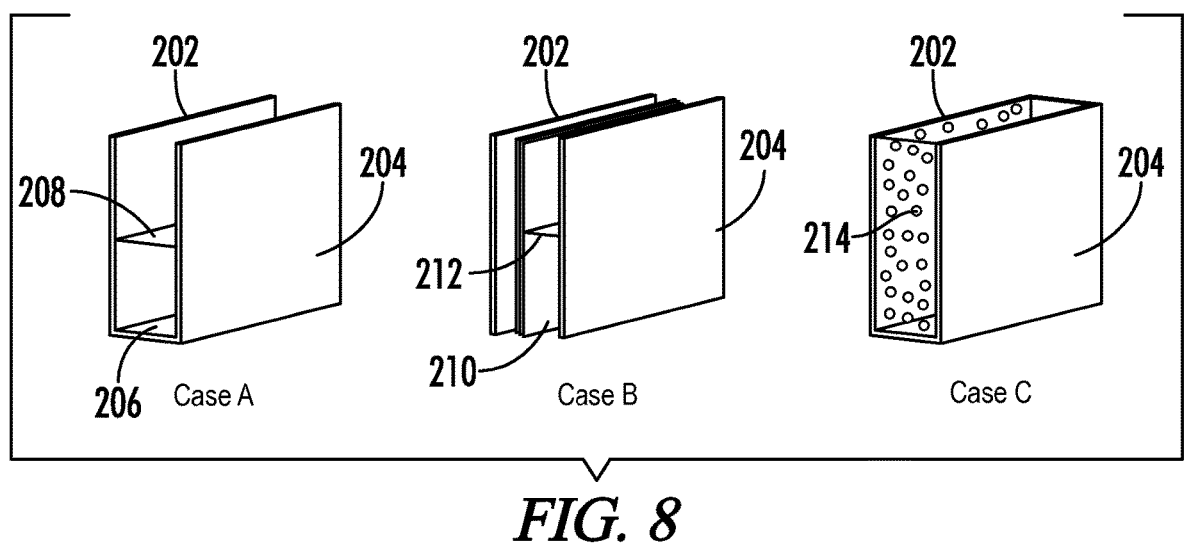
FIG. 8 illustrates an embodiment of a propellant mass detector with parallel plates.

As illustrated in FIG. 8, three simple orientations are analyzed in this experiment. Case A illustrates two flat panels 202 and 204 with the liquid propellant oriented as if it lay in the bottom of the tank 206 (rectangular LAD), or, equivalently, at any point from the bottom to the top 208. Ignoring end effects, the capacitance is the same irrespective of the location. The height of the liquid can range from 0 to the height of the flat walls 202 and 204. Case B assumes the liquid 210 forms a slab with a thickness, t, which can range from 0 to the wall separation distance, d (212); this slab 212 can be on either side of the tank or LAD walls, or at any point in the middle. Case C assumes that the liquid and gas form a uniform mixture 214.

Capacitance is determined for the entire volume enclosed as a function of fill fraction, ranging from 0 to 1, and this fill fraction, F, is directly related to liquid height, as in Case A, or thickness as in Case B, or the liquid quality of the uniform mixture in Case C. The following also shows that the averaged error approaches zero over time, assuming that the liquid is equally likely to be at any location within the volume. Since mass is directly related to capacitance for a given orientation, and since there is very little error for the worst case orientation examples, capacitance measurements of the interior will determine the liquid quantity, or, conversely, the volume of gas. For this analysis, the variation in dielectric constant as a function of temperature is ignored, but in principle, if the saturation temperature is known, then the dielectric constant is known.

From standard texts the capacitance of various configurations is determined. First, the Capacitance of Two Parallel Flat Plates, distance d apart, Area A, in Vacuum, is:

$$Co = \varepsilon_0 A/d, \quad (1)$$

where $\varepsilon_0$ is the permittivity of free space, $8.854 \times 10^{-12}$ farads/meter.

If filled with a dielectric material of dielectric constant, $K_{liquid}$, the Capacitance of Two Parallel Flat Plates, Completely Filled with Dielectric Material is:

$$C = Co/(1-((K-1)/K) \quad (2)$$

These two equations can be used to determine the capacitance for Case A, which has the liquid filling the volume with fill fraction, F, as shown in FIG. 8. Again, note that this rectangular slab 208, which covers the region between the walls, can be at any height, ignoring end effects. As a function of F, the capacitance for Case A—Capacitance with Dielectric Filling Portion of Volume, as a rectangular slab of thickness d and Fill Fraction F is given by:

$$C = (1-F)Co + FCo/(1-((K-1)/K) \quad (3)$$

Similarly, for the slab having a thickness that ranges from 0 to the wall separation distance, d, then t=Fd. Note, the slab can be at any position between d and have the same capacitance. Thus, as a function of F, we have Case B—Capacitance of Two Parallel Flat Plates, with dielectric slab of area A and thickness Fd:

$$C = Co/(1-((K-1/K)(t/d)) = Co/(1-((K-1)/K)F)) \quad (4)$$

With a uniform mixture, the average dielectric constant is $$K_{mix} = FK_{liquid} + (1-F)K_{gas} \quad (5)$$

($K_{gas}$ is 1, for standard temperature and pressure)
This mixture fills the volume between the plates, and thus capacitance is the same as for Eq'n 2, but with K replaced by $K_{mix}$.
Thus, Case C—Capacitance of Two Parallel Flat Plates, With Dielectric Liquid Uniformly Mixed with Gas, Filling Volume:

$$C = Co/(1-(Kmix-1)Kmix) \quad (6)$$

Figure 9:
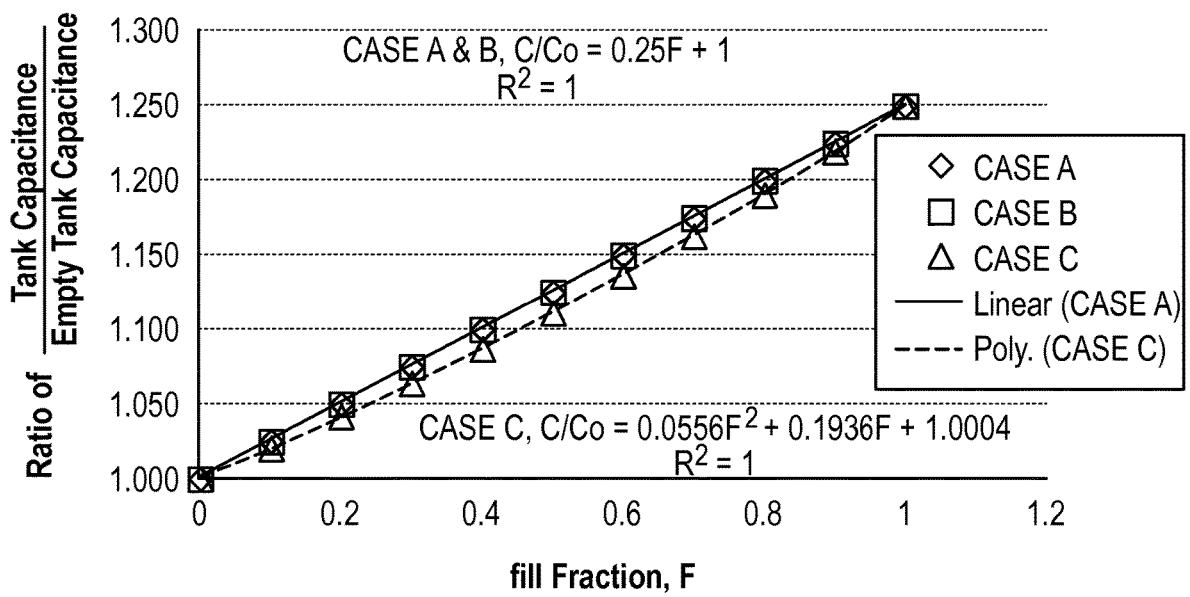
FIG. 9 is a graph showing the capacitance ratio of different liquid orientations versus fill fraction for liquid hydrogen.

FIG. 9 shows the capacitance as a function of fill fraction, F. The capacitance is directly related to the mass, and thus three values for mass correspond to any given capacitance value. Case A and B are identical. Case C is slightly lower, but overall there is good agreement.

Figure 10:
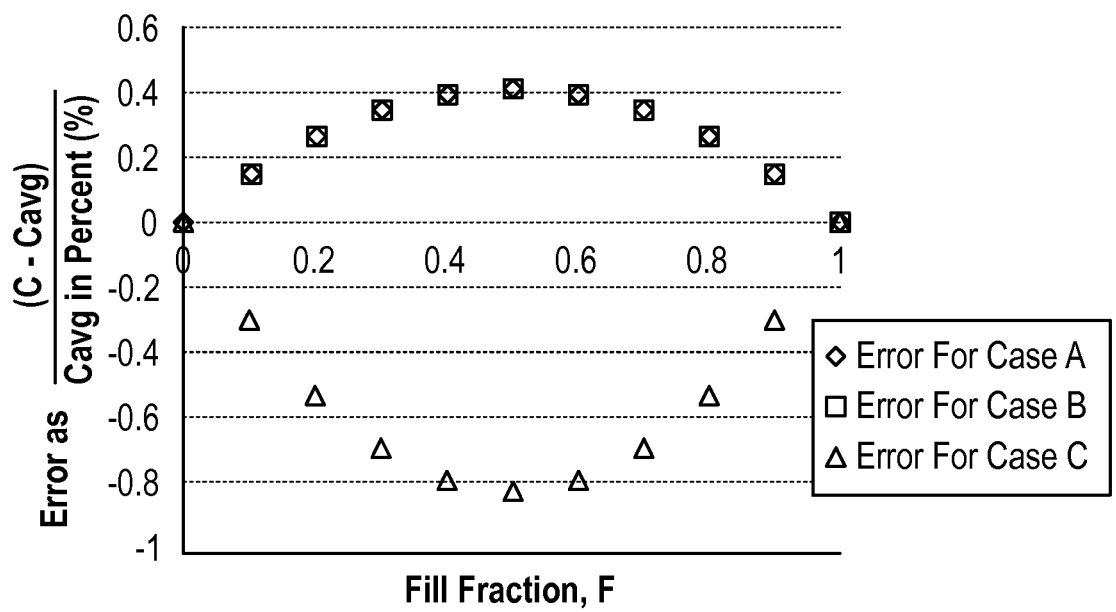
FIG. 10 is a graph of error as a function of fill fraction.

FIG. 10 illustrates the difference, or error, between the capacitance for each case, minus the average capacitance for the three cases, and divided by the average value for the three capacitances. These relative errors are determined at each fill fraction. FIG. 10 shows that maximum error is for the volume half full, at F=0.5, but all three cases are in reasonable agreement, and below 1%. It is also interesting to note that the two identical capacitance error ratios for Cases A and B, when summed, are identical to the error ratio of Case C. Thus, if the liquid is equally probable of being at any location in the tank, then over time the error approaches zero at any fill fraction. This does not mean that the actual error is reduced to zero, however; it means that the uncertainty is reduced if the liquid moves within the volume, and the capacitance is averaged over time. The error is reduced to zero for the ideal case if the liquid position is known (e.g., it is a slab, etc.) and the appropriate equation for capacitance is used to determine F, for the measured capacitance. This observation leaves out the actual measurement error uncertainty present with any sensor or instrumentation system; it only addresses the lack of knowledge of liquid orientation.

Continuous measurement over time to form a running average will improve the accuracy at least to some degree, if the liquid is moving within the tank. This is helpful because rather than attempt to settle liquid to some given orientation, such as the bottom of the tank, there is benefit in actually allowing the liquid to move around inside the tank, as typically occurs in micro-gravity; in this case, no propellant is needed to settle.

If the liquid orientation is known, then the more accurate equation can be used to determine the propellant mass, with increased accuracy. But, even without these approaches, the worst case error is small. Using the trend line equations for the capacitance as a function of fill factor, the ratio of the solution for the slab or the liquid settled at the bottom (or any position between the top and the bottom) to that for the mixture of gas and vapor is:

Capacitance of A or B/Capacitance of Mixture=
$(0.25F+1)/(0.00556F^2+0.1936F+1.0004)$.

For F=0.5, this is
Capacitance of A or B/Capacitance of Mixture=1.125/1.10219=1.02, or, a 2% error for the worst case. Thus, the time averaged value improves the accuracy when the liquid is moving within the tank, since this is at most 0.8%, compared to the average.

Analysis/Experiment 2: Cylindrical Condenser Configuration

The rectangular capacitor is a reasonable approximation to the LAD, but a poor representation of a tank. The right circular cylinder (flat ends, not hemispherical or Cassinnian, etc.) was solved to represent the tank. The results are similar to those for the flat plate capacitor. The three cases that are easy to solve involve filling the tank such that the liquid forms simple shapes, or is a mixture of liquid and gas, evenly distributed throughout the tank. The equations are known for the examples analyzed to date, but more complex shapes for the liquid and tank can be developed for specific instances and design configurations, but this is not necessary to illustrate the principle. For Case A, the liquid forms an annular region between a central electrode and the tank wall with the fill factor, F, designating the height. The position relative to the top or bottom does not change the capacitance (ignoring end effects). For Case B, the liquid forms a sector. For Case C, the liquid and gas are evenly mixed, and the mixture fills the region between the inner and outer cylindrical electrodes. The results for these three cases are the same, although the equations at first appear to be somewhat different. The equations are summarized below:

$$C_{vacuum}=2\pi\varepsilon_0 L/LN(b/a) \text{ for vacuum,}$$

$$C_{liquid}=2\pi\varepsilon_0 LK_{liquid}/LN(b/a) \text{ for cylinder filled with liquid.}$$

CASE A—Cylindrical Liquid, Filling Bottom, Top, or Anyplace in Middle $$C_{total}=2\pi\varepsilon_0 LK_{liquid}/LN(b/a)F+2\pi\varepsilon L/LN(b/a)(1-F)$$

CASE B—Cylindrical Liquid, Sector of Circle $$C_{total}=2\pi\varepsilon_0 LK_{liquid}/LN(b/a)F+2\pi\varepsilon L/LN(b/a)(1-F)$$

CASE C—Mixture of Liquid and Gas $$K_{mixture}=FK_{liquid}+(1-F)K_{gas}$$

$$C_{total}=2\pi\varepsilon LK_{mixture}/LN(b/a)=2\pi\varepsilon LK_{liquid}/LN(b/a)F+2\pi\varepsilon L/LN(b/a)(1-F)$$

Figure 11:
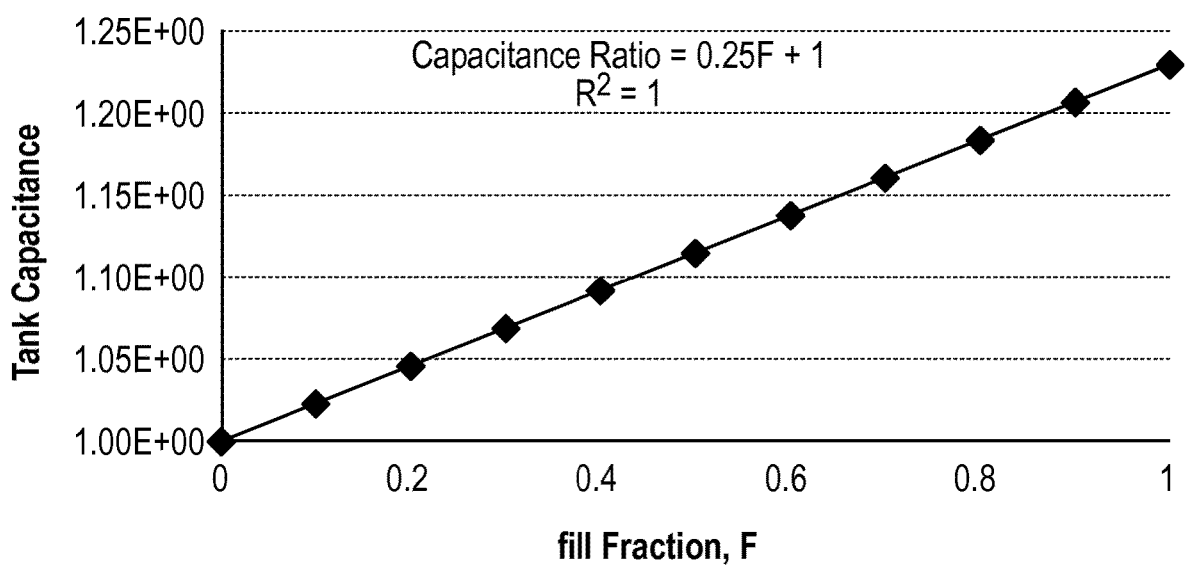
FIG. 11 is a graph of tank capacitance ratio verses fill fraction for liquid hydrogen in a right cylindrical cylinder.

The three cases are plotted for a right circular cylindrical tank in FIG. 11. This shows the ratio of a tank relative to the empty tank, and, as expected, it varies with the assume dielectric constant of liquid hydrogen (K=1.25) relative to gas (K=1).

Measurement Technique:

Conventional commercial off-the-shelf (COTS) hardware can be used to measure capacitance inside the tank. One method uses a "Wheatstone" bridge, AC current, etc. to determine capacitance (or inductance). When balanced, the bridge has:

$$C_1 R_2 = C_3 R_4$$

If $C_1$ is the capacitance of the tank interior, and $R_2$, $R_4$, and $C_3$ are known at balance, $C_1$ is determined. This is treated in detail in various texts, such as Smythe[2]. Since capacitance probes are typically used on space vehicle tanks, this method is compatible with existing systems. A Fluke multi-meter, typical of COTS equipment, was used for testing.

System Design and Operation Issues:

There are several design and operational issues that illustrate the advantage of this "full volume" capacitance measurement technique, such as mounting, configuration options, etc.

In principle, the inner electrode(s) could be formed by thin wires, rods, tubes, plates, or screens supported within the tank or LAD, with one or more conventional coax cable tank penetrations through the tank wall, man-way, etc. The inner electrodes would be in various configurations to ensure that measurements were made that determined the liquid mass reasonably accurately no matter how the liquid was oriented within the volume. For the tank, for example, very small, lightweight coarse mesh screens could be positioned as annuli with essentially comparable capacitance per unit length by having the same ratio of the outer to inner radius for each pair. Multiple wires, rod, or plates would increase accuracy for micro-gravity, since the propellant could be located in a myriad number of configurations. These electrodes would be small, thin, and of negligible weight compared to the tank. They would have little or no discernible impact on propellant flow. Internal hardware, such as baffles, pressure bottles, other instrumentation, sensor rakes, etc., can form either the electrode (if insulated from the tank) or the ground, and thus produce a localized capacitance that is of particular importance. For example, there is a tendency in micro-gravity for the liquid to be attracted to hardware that forms, in effect, a surface tension "capillary tube" because of its size, proximity to the walls or other hardware. Liquid can also be attracted to the electrodes by capillary forces. But with the capacitance system for the entire tank, the net error of these preferential locations and concentrations of liquid can be reduced by taking advantage of the hardware, sensors, etc.

This is an advantage compared to, say, point sensors, which could erroneously predict a liquid height that was totally in error, simply because the liquid was attached to the sensor in micro-gravity, and thus it indicated that the region was filled with liquid. The capacitance is relatively insensitive to that condition, and thus the error is much smaller. This aspect is particularly advantageous for the LAD, because it is necessary to detect small amounts of gas, corresponding to bubble formation from bubble point failure or boiling within the LAD. Tests in 1-G have shown that the liquid hydrogen can remain on point level sensors, thus leading to false readings. With the capacitance measurement within the LAD detecting this incipient surface tension breakdown condition, steps could be taken to maintain acquisition, such as increasing the thermal conditioning flow rate for an internal thermodynamic vent system, or reducing the acceleration or outflow rate, etc.

Without this measurement, breakdown could occur and the condition would not necessarily be known. For conditions such as engine restart, that condition could lead to gas ingestion into the pump, and that poses a serious problem for pump integrity and engine combustion instability.

Now, therefore, the following is claimed:

1. An apparatus, comprising:
   an electrically conductive tank for containing a liquid, the tank having a wall defining a boundary between an interior of the tank and an exterior of the tank;
   a first electrode disposed within the interior of the tank such that at least a portion of the liquid is disposed between the first electrode and the wall of the tank;
   a first capacitance measuring circuit electrically connected to the first electrode and the wall of the tank and configured to measure a capacitance between the first electrode and the wall of the tank;
   a tube disposed within the tank, the tube defining an outlet port for the tank;
   a second electrode positioned within the tube;
   a second capacitance measuring circuit electrically connected to the second electrode and a wall of the tube and configured to measure a capacitance between the second electrode and the wall of the tube; and
   a computing system configured to determine a total mass of the liquid in the interior of the tank based on the first capacitance between the first electrode and the wall of the tank measured by the first capacitance measuring circuit and the second capacitance between the second electrode and the wall of the tube measured by the second capacitance measuring circuit, the computing system further configured to provide an output to a user indicating the total mass of the liquid determined to be in the interior of the tank.

2. The apparatus of claim 1, wherein the liquid is a propellant.

3. The apparatus of claim 1, further comprising two or more first electrodes disposed within the interior of the tank.

4. The apparatus of claim 1, wherein the first electrode is coupled to an insulator.

5. The apparatus of claim 1, wherein the tank is located in a microgravity environment.

6. The apparatus of claim 1, wherein the tank is grounded.

7. The apparatus of claim 1, wherein the liquid is a cryogenic propellant.

8. The apparatus of claim 1, wherein the first electrode has a first end electrically isolated from the tank by a first insulator and a second end opposite the first end electrically isolated from the tank by a second insulator.

9. The apparatus of claim 8, wherein the first insulator is coupled to the wall of the tank, and wherein the second insulator is coupled to the wall of the tank.

10. The apparatus of claim 1, wherein the computing system is configured to determine the total mass of the liquid in the tank independent of an orientation of the liquid in the tank.

11. The apparatus of claim 1, wherein the tank is positioned in a spacecraft for use in a microgravity environment.

12. The apparatus of claim 1, wherein the first electrode is one of a rod, wire, plate or screen.

13. The apparatus of claim 1, wherein the tank is configured to contain the liquid only in the interior of the tank.

14. A liquid acquisition device, comprising:
a tank;
a tube positioned in the tank and defining an outlet port for the tank, wherein at least a portion of a wall of the tube comprises a surface tension screen configured to permit liquid to enter the tube from the tank;
an electrode positioned within the tube;
a capacitance measuring circuit electrically connected to the electrode and the tube and configured to measure a capacitance between the electrode and the tube; and
a computing system configured to determine a mass of the liquid in the tube based on the capacitance measured by the capacitance measuring circuit.

15. An apparatus, comprising:
an electrically conductive tank for containing a liquid;
a first electrode disposed within the tank;
a first capacitance measuring circuit electrically connected to the first electrode and a wall of the tank;
a tube disposed within the tank, the tube defining an outlet port for the tank, wherein at least a portion of a wall of the tube comprises a liquid permeable material having a plurality of spaces to permit the liquid in the tank to enter the tube;
a second electrode positioned within the tube;
a second capacitance measuring circuit electrically connected to the second electrode and the wall of the tube; and
a computing system configured to determine a total amount of the liquid in the tank based on the capacitance measured by the first capacitance measuring circuit and the capacitance measured by the second capacitance measuring circuit.

16. The apparatus of claim 15, wherein the liquid is a propellant.

17. The apparatus of claim 15, wherein the first electrode is coupled to an insulator.

18. The apparatus of claim 15, wherein the tank is located in a microgravity environment.

19. The apparatus of claim 15, wherein the computing system is configured to determine a mass of the liquid in the tank based on the capacitance measured by the first capacitance measuring circuit and a mass of liquid in the tube based on the capacitance measured by the second capacitance measuring circuit, the total mass of liquid in the tank being a sum of the mass of liquid in the tank and the mass of liquid in the tube.

20. The apparatus of claim 15, further comprising:
a third electrode disposed within the tank; and
a third capacitance measuring circuit connected to the third electrode and the wall of the tank,
wherein the computing system is configured to determine the total amount of the liquid in the tank based on the capacitance measured by the third capacitance measuring circuit.

21. The apparatus of claim 20, wherein the computing system is configured to determine (1) an amount of the liquid in the tank based on the capacitance measured by the first capacitance measuring circuit and based on the capacitance measured by the third capacitance measuring circuit and (2) an amount of liquid in the tube based on the capacitance measured by the second capacitance measuring circuit, the total amount of liquid in the tank being a sum of the amount of liquid in the tank and the amount of liquid in the tube.

22. The apparatus of claim 15, wherein the liquid permeable material comprises a surface tension screen positioned adjacent to the wall of the tank.

23. The apparatus of claim 15, wherein the liquid permeable material comprises a plurality of interwoven fibers.

24. The apparatus of claim 15, wherein the first electrode is one of a rod, wire, plate or screen.

25. A method, comprising:
depositing a liquid into a tank having a tube positioned in the tank, the tank having a wall defining a boundary between an interior of the tank and an exterior of the tank and the tube defining an outlet port for the tank;
measuring a first capacitance between a first electrode within the tank and the wall of the tank;
measuring a second capacitance between a second electrode positioned within the tube and a wall of the tube;
determining a total mass of the liquid in the interior of the tank based on the measured first capacitance between the first electrode and the wall of the tank and the measured second capacitance between the second electrode and the wall of the tube; and
indicating the total mass of the liquid in the tank to a user.

26. The method of claim 25, wherein the liquid is a propellant.

27. The method of claim 25, wherein the determining the total mass of the liquid is performed in a microgravity environment.

* * * * *